March 31, 1942.　　S. P. AMBROSE　　2,278,051
APPARATUS FOR CUTTING AND MIXING
Filed April 11, 1940　　2 Sheets-Sheet 2

INVENTOR.
SAMUEL P. AMBROSE.
BY Thomas R. O'Malley
ATTORNEY.

Patented Mar. 31, 1942

2,278,051

UNITED STATES PATENT OFFICE 2,278,051

APPARATUS FOR CUTTING AND MIXING

Samuel P. Ambrose, Chester, Pa., assignor to American Viscose Corporation, Wilmington, Del., a corporation of Delaware Application April 11, 1940, Serial No. 329,115

6 Claims. (Cl. 83—6)

This invention relates to improvements in apparatus for cutting and mixing materials.

In the manufacture of rayon by the viscose process, xanthated cellulose is mixed with a caustic soda solution to form a cellulose solution from which the rayon is spun. During the xanthation of the cellulose, which is generally carried out in a rotating churn, some of the xanthated cellulose agglomerates into lumps or balls. In order to insure a thorough mixing of the xanthated cellulose with the caustic soda solution, the lumps or balls must be broken up and each particle of the xanthated cellulose contact the caustic soda. The cellulose xanthate on dissolving in the caustic soda forms a viscous solution commonly called viscose. Balls or large particles of cellulose xanthate on contacting the caustic soda tend to become coated with the viscous solution which prevents the caustic soda from penetrating into the interior with the result that all of the cellulose xanthate is not dissolved. In order to obtain a thorough mixing it has been the practice to mix the cellulose xanthate and the caustic soda for a long period of time. This operation is costly and time consuming.

This invention has for its principal object to provide an improved apparatus for cutting and mixing material with a liquid.

Other objects of the invention will be apparent from the following description and accompanying drawings in which a preferred form of the invention is shown.

Figure 1:
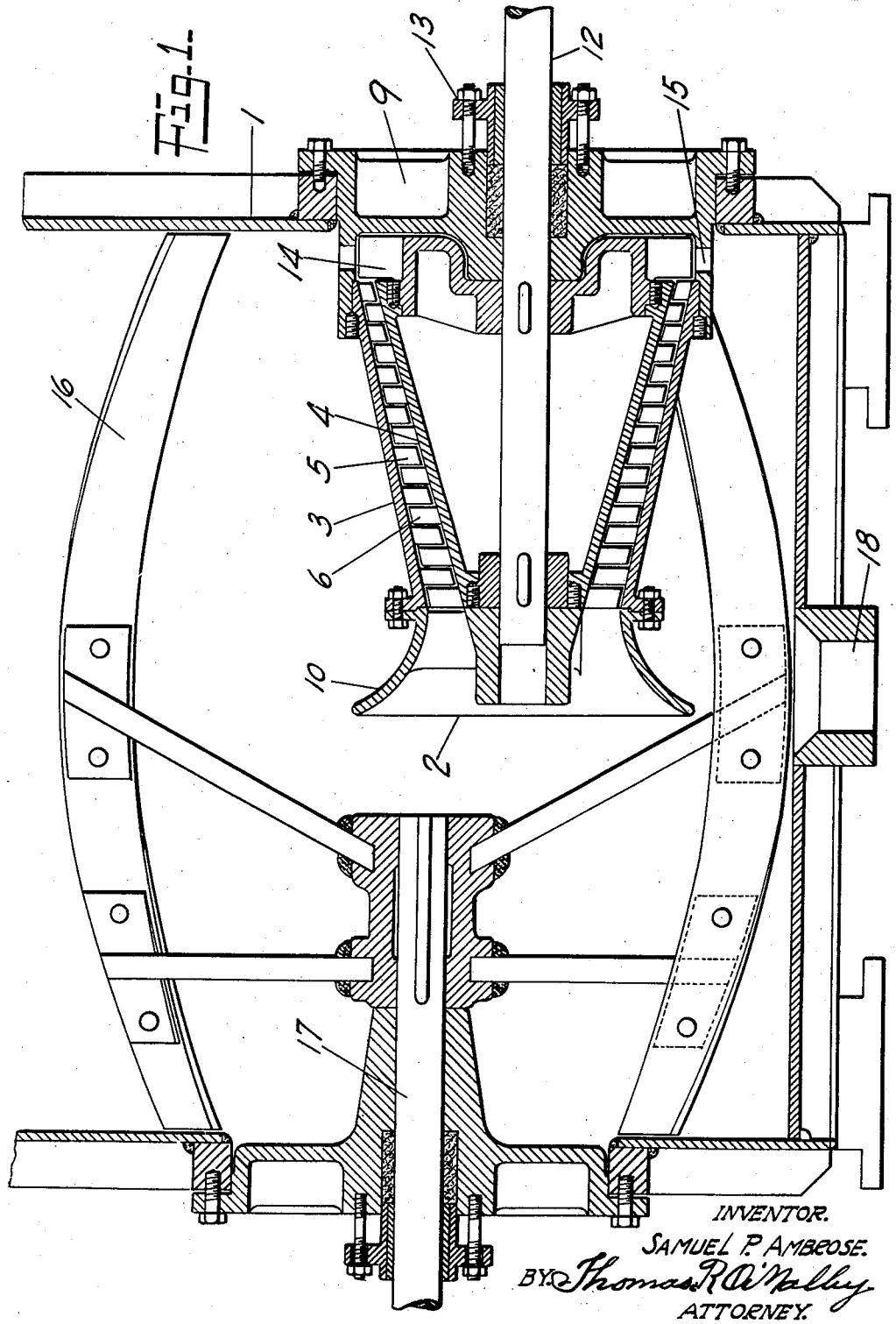
Figure 1 is a vertical sectional view taken through the center line of a form of cutting and mixing apparatus embodying the invention.
Figure 2:
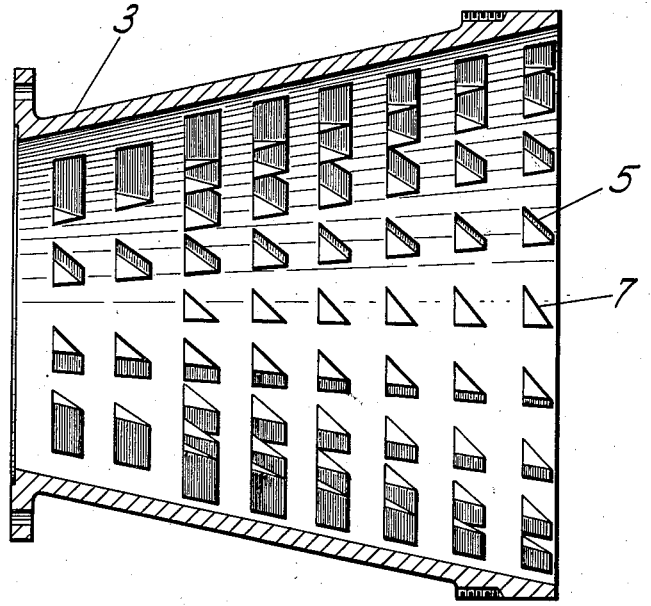
Figure 2 is a sectional view taken through the center line of the stator of the cutting and mixing apparatus shown in Figure 1.
Figure 3:
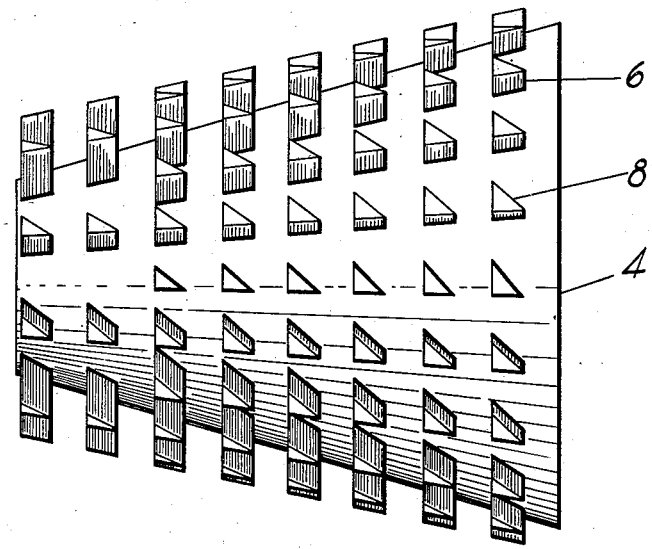
Figure 3 is a view of the shell of the rotor of the cutting and mixing apparatus shown in Figure 1.

The invention as shown in the drawings comprises the mixing tank 1 provided with the cutting and mixing means which are indicated in general by reference character 2. The cutting and mixing means comprises the stator 3 and the rotor 4 which are conical in shape and have the same center line. The stator is fastened to a closure member 9 which extends into an opening in the wall of the mixing tank and is secured to the wall. The rotor is fixed to the drive shaft 12 which passes through the stuffing box 13 in the closure member and is driven by suitable means which are not shown. With this arrangement, the cutting and mixing means may be removed as a unit through the opening in the side wall of the mixing tank. The stator is provided with annular rows of inwardly extending, spaced teeth 5, which are of such length that the tips have a minimum of clearance with the rotor and the rotor is provided with annular rows of outwardly extending, spaced teeth 6, which are of such length that the tips have a minimum of clearance with the stator. Fewer teeth are positioned at the inlet or smaller end than at the larger or outlet end so that the teeth are all spaced substantially the same annular distance apart. The teeth on the stator are spaced longitudinally to provide a minimum of clearance for the teeth on the rotor. The teeth on the rotor and stator are beveled so as to have opposed faces 7 and 8 which are inclined to the longitudinal direction. Paddle means 14 are arranged to rotate with the rotor to discharge material from the cutting and mixing means through the openings 15 back into the mixing tank. Additional mixing means are positioned in the mixing tank comprising the paddles 16 mounted on the shaft 17 which is driven by suitable means which are not shown.

When the apparatus is used for cutting and mixing cellulose xanthate with caustic soda to form viscose spinning solution, the caustic soda and the cellulose xanthate are introduced into the mixing tank and enter the inlet or smaller end of the cutting and mixing means through the bell shaped member 10 and after passing through the cutting and mixing means are discharged from the larger or outlet end. The annular spacing of the teeth at the inlet end of the rotor and stator is sufficient to permit relatively large lumps of cellulose xanthate to enter and to be broken up at the beginning of the cutting and mixing operation. The material in passing through the cutting and mixing means is carried around by the teeth on the rotor and due to the beveled faces of the teeth, is also directed toward the discharge end. The material is directed from the teeth on the rotor against the teeth on the stator and due to the minimum of clearance between the teeth the material is subjected to a shearing action. The area of the passageway between the rotor and the stator decreases slightly from the inlet to the discharge end. Due to the decrease in area of the passage and the increase in the peripheral speed of the rotor toward the discharge end, the velocity of the material passing through the cutting and mixing means and the shearing action thereon increases as it approaches the discharge end. The material after reaching the discharge end is discharged by means of the paddle blades 14. The passage of material through the cutting and mixing means is continuous and because of the paddles 16, which continuously stir the material in the mixing tank, all of the material in the mixing tank passes through the cutting and mixing means many times during a relatively short time insuring a thorough and uniform mixing.

While this invention has been described with reference to the manufacture of viscose solutions, it is to be understood that it is not limited to this use. It is also to be understood that changes and variations may be made without departing from the spirit and scope of the invention as defined by the appended claims.

What I claim is:

1. Means for cutting and mixing materials comprising a hollow conical member having spaced annular rows of inwardly extending teeth, a second conical member, the elements in whose surface make a greater angle of inclination with the axis of the cone than that made by the elements of the first conical member, substantially concentrically positioned in the first member to provide a passageway therebetween having a generally annular cross-sectional area interrupted by the teeth which decreases in thickness from the smaller to the larger ends of said conical members and having teeth extending outwardly therefrom into the annular spaces between the teeth on the first member, the disposition and size of the teeth being such that the effective area of the passageway decreases slightly from the smaller to the larger ends of the members, each of the teeth having one face inclined to the longitudinal direction of the members to form with a second face of the tooth a dihedral angle constituting a cutting edge, the teeth being disposed with said cutting edges nearest the smaller ends of the conical members and with the inclined faces of the teeth on the first member extending from their respective cutting edges in a peripheral direction about said member opposite to the peripheral direction in which the inclined faces of the teeth on the second member extend from their respective cutting edges, each row of teeth on the hollow member being spaced with a minimum of clearance with respect to at least one of the adjacent rows of teeth on the second conical member, and means for imparting relative rotation to said members, said rotation being in such a direction that the inclined faces of the teeth are the leading surfaces thereof.

2. Means for cutting and mixing materials comprising a hollow conical stator having spaced annular rows of inwardly extending teeth and a conical rotor, the elements in whose surface make a greater angle of inclination with the axis of the cone than that made by the elements of the first conical member, rotatably mounted substantially concentrically in the stator to provide a passageway therebetween and having teeth extending outwardly therefrom into the annular spaces between the teeth on the stator, each of the teeth having one face inclined to the longitudinal direction of the members to form with a second face of the tooth a dihedral angle constituting a cutting edge, the teeth being disposed with said cutting edges nearest the smaller ends of the conical members and with the inclined faces of the teeth on the first member extending from their respective cutting edges in a peripheral direction about said member opposite to the peripheral direction in which the inclined faces of the teeth on the second member extend from their respective cutting edges, and means for imparting relative rotation to said members, said rotation being in such a direction that the inclined faces of the teeth are the leading surfaces thereof.

3. Means for cutting and mixing materials comprising a hollow conical stator having spaced annular rows of inwardly extending teeth and a conical rotor, the elements in whose surface make a greater angle of inclination with the axis of the cone than that made by the elements of the first conical member, rotatably mounted substantially concentrically in the stator to provide a passageway therebetween having an annular cross-sectional area interrupted by the teeth which decreases in thickness from the smaller to the larger ends of said conical members, said second conical member having teeth extending outwardly therefrom into the annular spaces between the teeth on the stator, the disposition and size of the teeth being such that the effective area of the passageway decreases slightly from the smaller to the larger ends of the members, each of the teeth having one face inclined to the longitudinal direction of the members to form with a second face of the tooth a dihedral angle constituting a cutting edge, the teeth being disposed with said cutting edges nearest the smaller ends of the conical members and with the inclined faces of the teeth on the first member extending from their respective cutting edges in a peripheral direction about said member opposite to the peripheral direction in which the inclined faces of the teeth on the second member extend from their respective cutting edges, each row of teeth on the hollow member being spaced with a minimum of clearance with respect to at least one of the adjacent rows of teeth on the second conical member, and means for imparting relative rotation to said members, said rotation being in such a direction that the inclined faces of the teeth are the leading surfaces thereof.

4. Means for cutting and mixing materials comprising a mixing tank, an opening in a wall thereof, mixing means rotatable in said tank, means for rotating said mixing means, a closure member for said opening having mounted thereon for bodily insertion into and removal from said tank with the emplacement or removal respectively of said closure member a cutting and mixing means comprising a stationary hollow conical member having spaced annular rows of inwardly extending teeth and being secured at its larger end to said closure member, a second conical member rotatably mounted on said closure member and substantially concentrically within said stationary conical member thereby forming a passageway therebetween, said rotatable conical member having teeth extending outwardly into the annular spaces between the teeth on the stationary member, each row of teeth on the rotatable member being spaced with a minimum amount of clearance with respect to at least one of the adjacent rows of teeth on said stationary member, openings adjacent the larger and smaller ends of said conical members for permitting circuitous flow through the tank and the passageway of the cutting and mixing means therein, and means for rotating the rotatable conical member.

5. Means for cutting and mixing materials comprising a mixing tank, an opening in a wall thereof, mixing means rotatable in said tank, means for rotating said mixing means, a closure member for said opening having mounted thereon for bodily insertion into and removal from said tank with the emplacement or removal respectively of said closure member a cutting and mixing means comprising a stationary hollow conical member having spaced annular rows of inwardly extending teeth and being secured at its larger end to said closure member, a second conical member rotatably mounted on said closure member and substantially concentrically within said stationary conical member thereby forming a passageway therebetween, said rotatable conical member having teeth extending outwardly into the annular spaces between the teeth on the stationary member, each row of teeth on the rotatable member being spaced with a minimum amount of clearance with respect to at least one of the adjacent rows of teeth on said stationary member, openings adjacent the larger and smaller ends of said conical members for permitting circuitous flow through the tank and the passageway of the cutting and mixing means therein, impeller blades mounted adjacent the larger end of said rotatable conical member for rotation therewith to assist the discharge flow from said passageway into the tank through the openings adjacent the larger ends of the conical members, and means for rotating the rotatable conical member.

6. Means for cutting and mixing materials comprising a mixing tank, an opening in a wall thereof, mixing means rotatable in said tank, means for rotating said mixing means, a closure member for said opening having mounted thereon for bodily insertion into and removal from said tank with the emplacement or removal respectively of said closure member a cutting and mixing means comprising a stationary hollow conical member having spaced annular rows of inwardly extending teeth and being secured at its larger end to said closure member and a second conical member rotatably mounted on said closure member and substantially concentrically within said stationary conical member thereby forming a passageway therebetween, said rotatable conical member having teeth extending outwardly into the annular spaces between the teeth on the stationary member, each row of teeth on the rotatable member being spaced with a minimum amount of clearance with respect to at least one of the adjacent rows of teeth on said stationary member, each of the teeth having one face inclined to the longitudinal direction of the members to form with a second face of the tooth a dihedral angle constituting a cutting edge, the teeth being disposed with said cutting edges nearest the smaller ends of the conical members and with the inclined faces of the teeth on the first member extending from their respective cutting edges in a peripheral direction about said member opposite to the peripheral direction in which the inclined faces of the teeth on the second member extend from their respective cutting edges, openings adjacent the larger and smaller ends of said conical members for permitting circuitous flow through the tank and the passageway of the cutting and mixing means therein, and means for rotating said rotatable member in a direction such that the inclined faces of the teeth thereon are the leading surfaces thereof.

SAMUEL P. AMBROSE.